United States Patent Office 3,456,360
Patented July 22, 1969

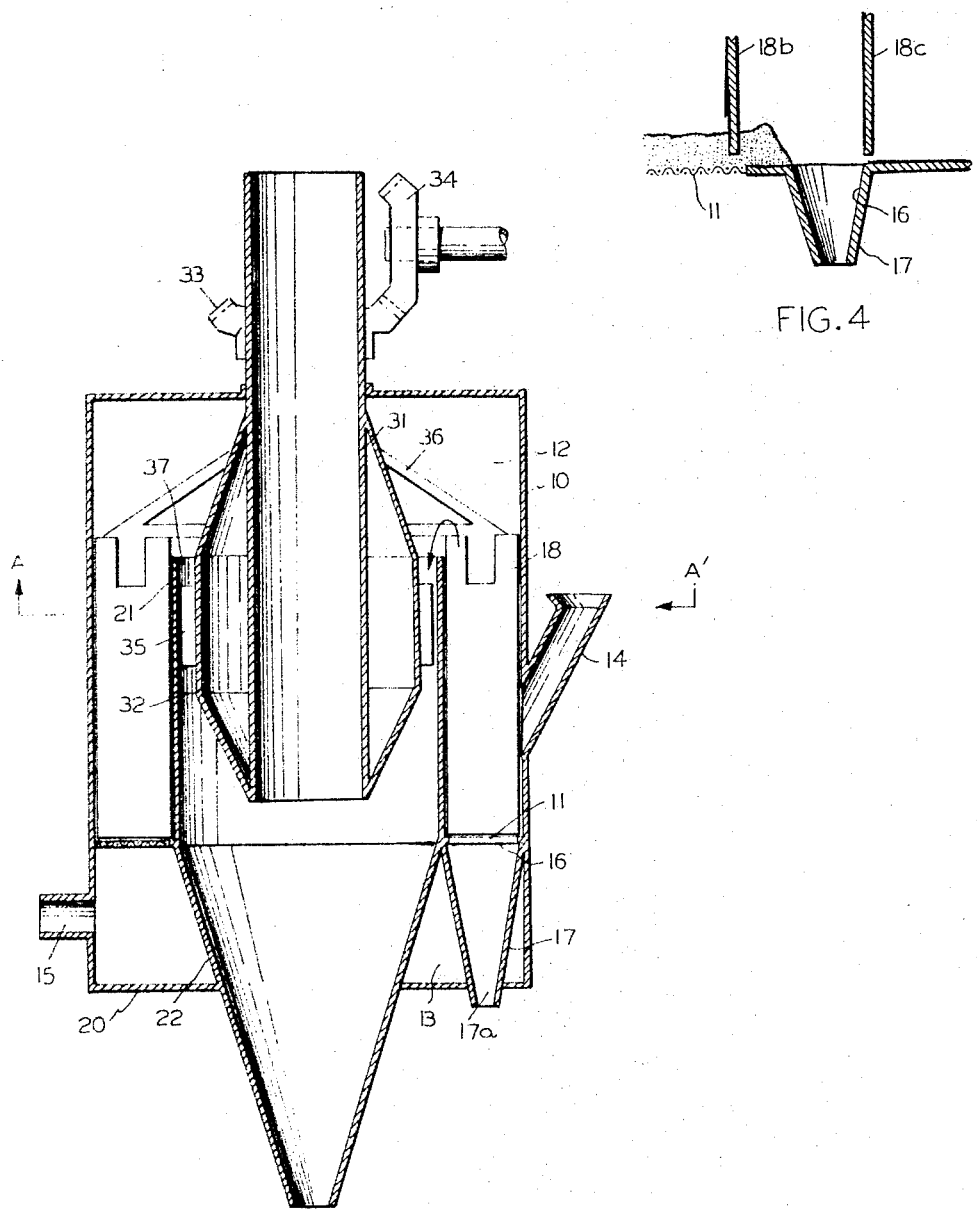

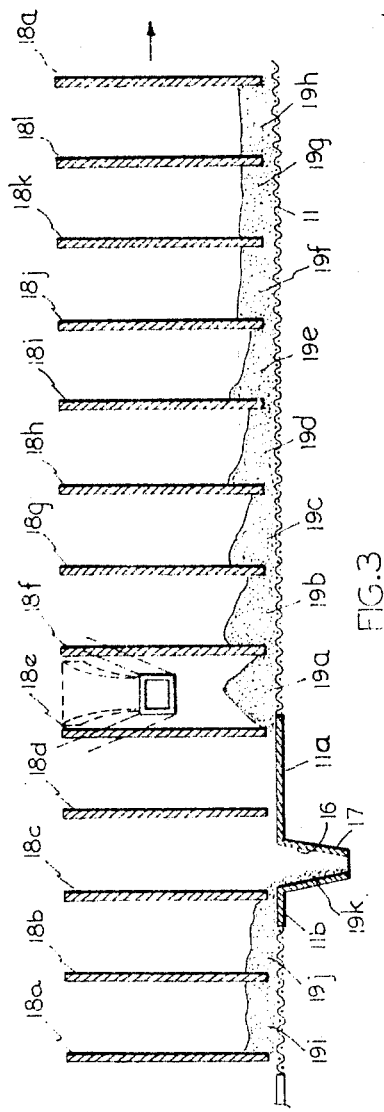
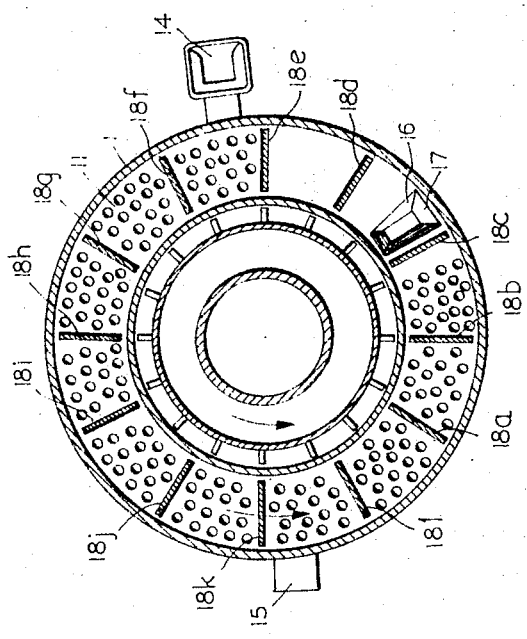

3,456,360
APPARATUS FOR FLUIDIZED DRYING AND SEPARATION
Haruyuki Terakawa, Yao-shi, Osaka Prefecture, Japan, assignor to Shionogi & Co., Ltd., Osaka, Japan
Filed Jan. 15, 1968, Ser. No. 697,894
Claims priority, application Japan, Jan. 13, 1967, 42/2,495
Int. Cl. F26b *17/32, 11/14*
U.S. Cl. 34—57      1 Claim

ABSTRACT OF THE DISCLOSURE

Improved performance of fluidized drying of powder or granular material and of effective collecting of the product including carryover thereof, is attained by an apparatus equipped with a radially and movably partitioned annular drying chamber for fluidized layer of the material which is being continuously transferred from an inlet to an outlet, combined with a flowthrough reflex cyclone having an outlet tube of double construction which is installed integrally inside and coaxially with said annular drying chamber.

BACKGROUND OF THE INVENTION

Field of the invention

The present invention generally relates to the art of fluidized drying; particularly, it concerns an apparatus capable of performing continuous fluidized drying of powder or granular material and effective collecting even carryover particles by taking advantage of the excellent performance of an integrally equipped cyclone separator.

Description of prior art

Fluidized drying, as has been and is known, is an art of drying powder or granular material while it is being fluidized by and in intimate contact with hot air of high dryness. And it is primarily characterized by the uniform temperature of the material in the fluidized layer, relatively compact size of the apparatus for a large thermal capacity coefficient and the availability of high temperature gas. The application is, however, limted to a batch or semi-batch system apparatus by the difficulty of designing its charging and discharging means.

In order to perform the fluidized drying continuously, there has hitherto been known a method of utilizing counter flow of hot air which contacts with the material sought to be dried while it is traveling down by gravity along a spirally constructed stairway of perforated plates and a method of contacting the material which is traveling through a multiplicity of drying chambers or a multiply divided drying chamber in a fluidized state with hot air which also serves to transfer the fluidized layer substantially horizontally.

As previously indicated, many proposals for effecting fluidized drying continuously have been presented, but there are still many problems remaining to be solved for this purpose, that is, gas-tightening of charging and discharging openings without spoiling the function of continuous operation, providing a means for transferring the fluidized layer while preventing channeling (blowthrough) and promoting dispersion of the material, and equalization of period of time every portion of the material remains in the apparatus.

On the other hand, the exhausted gas, which is sometimes highly humid and must be kept warm in order to prevent the outbreak of dew, otherwise is apt to adhere to the components of the apparatus as a layer which is very difficult to clean out, is however very truoblesome to handle. Moreover, it is sometimes extremely dangerous for the apparatus in case where the dust includes a corrosive liquid.

The exhausted gas, that is, hot air which has finished the contact with the material to be dried, generally includes carry-over (fine dust particles) of the material, which must be collected by introducing the gas into a collecting apparatus such as a bag filter or cyclone separator.

Therefore, a proposal of equipping a cyclone inside the drying apparatus has been made for fulfilling the requirement of such case (see, for example, Japanese utility model publication No. 17348/66) though, this proposal merely concerns a drying apparatus of batch operation and the problems of the gas-tightening of the charging and discharging openings and the effective installation of separating apparatus have been left unsolved.

As is recognized by this proposal, the type of the separating apparatus and the mode of operation of such purpose would, however, be considerably limited by the simple reason of internal mounting, and arbitrary selection of the most suited dust collecting apparatus after the nature of the dust particle to be treated and the gaseous medium, might sometimes be very difficult.

That is, a conventional tangential flow type cyclone, although it has a comparatively high dust collecting efficiency, cannot be employed as a dust collecting apparatus which has to be confined in a limited space and be able to collect the exhaust which originates from almost the entire periphery of the drying chamber; and an axial flow type cyclone must inevitably be employed because of the aforementioned space limitation and the manner according to which the exhaust inflows.

On the other hand, although a conventional axial flow type cyclone is suited for mass treatment because of its low pressure drop, good dust collecting performance cannot be expected because the downward path of the spiral flow of the gaseous medium inside the separating chamber, is adjacent the path of the central ascending flow and, therefore, the spiral flow is apt to be taken into the ascending flow in large percent to the effect of discharging the medium without being subjected to a sufficient dust separating action.

That is, it has long been considered that such flow of the medium in this type of cyclone diminishes the length effective for the separation and prevents increase in dust collecting efficiency. In other words, the path of the flow of the medium, which is really effective for the separation of such conventional cyclone, is primarily limited to the upper half of the conical portion, and therefore the lower half of the conical portion does not serve for the actual separation.

SUMMARY OF THE INVENTION

It is, therefore, the primary object of the present invention to solve the previously discussed various problems which are believed inherent in the conventional apparatus and to provide an apparatus for fluidized drying and separation having efficient performance with respect to the various aforediscussed aspects.

Brief description of the drawings

The objects and attendant advantages of the present invention will become apparent to those who are conversant with the art to which the present invention pertains from the following detailed description when read in conjunction with the accompanying drawings, wherein like reference numerals are used to desingate like parts throughout several views:

FIG. 1 represents a side sectional elevation of an apparatus embodying the present invention, FIG. 2 represents a plan sectional view along the line A–A' of FIG. 1, FIG. 3 is a vertical rectilinear fragmentary sectional view of the drying chamber including perforated plate, fluidized layer thereon and multiplicity of the partition plates, extended and projected onto a plane which is tangential to the cylindrical surface containing the center circle of said annular drying chamber, and FIG. 4 is an enlarged view of the portion of FIG. 3 including a means for discharging treated material.

Description of preferred embodiment

The body of the dryer, comprising an outer cylindrical housing 10 is divided into two stacked annular cylindrical spaces surrounding an internally equipped cyclone and constituting a drying chamber 12 and a hot air chamber 13 respectively, by an annular perforated plate 11 and a cylindrical portion 21 and conical portion 22 of the cyclone occupying the central portion of the body.

A material charging opening 14 having a shape of hopper and a hot air intake opening of any type 15 are provided on the housing 10, the outer walls of the drying chamber 12 and the hot air chamber 13, respectively. A means for discharging treated material 17 having a shape of a generally tapered tube is installed in the hot air chamber 13 with a top flaired end 16 which opens to the drying chamber at the annular perforated plate 11 and a bottom end 17a piercing through the bottom plate 20 of the hot air chamber 13, and having the function of discharging the dried material outside the apparatus.

Into the hot air chamber 13, hot air sufficient enough to form a fluidized layer 19 of the material sought to be treated on the perforated plate 11 is continuously supplied from the intake opening 15.

The pressure of this hot air is slightly higher than the atmosphere pressure and the pressure difference thereof is controlled in order to prevent leakage of the material though the perforation and to suppress reverse flow of the material from the charging opening 14.

A multiplicity of spaced-apart partition plates 18a–18l, each of which is in conformity with the section of the drying chamber are suspended generally radially by the beam assembly 36 which connects the partition plates to the central rotating unit, an outlet tube assembly 31–35 of the cyclone separator.

The fluidized layer 19 of the material annularly formed in the previously described manner is transferred by the sweeping action of the partition plates 18a–18l which travels along the outer and inner walls and the perforated plate of the drying chamber.

The sweeping action of the partition plates 18a–18l promotes the dispersion of the charged material to form a uniform fluidized layer and prevents channeling of the layer 19 while it is moving through the annular drying chamber.

The vertical rectilinear fragmentary sectional view of the drying chamber represented by FIG. 3 will explain more comprehensively the action of the partition plates and the behavior of the material to be treated in the drying chamber.

In a series of sections divided by the partition plates 18a–18l, the charged material is first piled up on the spot with an inherent angle of the material, as indicated by numeral 19b–19e accompanied by the sequential movements of the partition plates in the direction to the right of the drawing.

When a certain drying state has been reached, a stationary fluidized layer having substantially a constant thickness 19f–19i is formed, where each of the partition plates exhibits a kind of sealing action so that the upper surface of the fluidized layer may not be inclined by the leakage of the material between the partition plate and the walls.

In sections proximate to the discharging opening 16, for example, the portion of the fluidized layer 19j closes to the opening 16, is trailing ahead to the opening 16. The layer is however forced to be discharged through the discharging opening 16 as dried material 19k by the partition plate 18c in the next moment.

A breadth corresponding to at least 1.5 sections of, and that corresponding to at least 0.3 sections of, the perforated plate 11 must be blinded or left plain as a plate having a smooth surface at portions 11a and 11b, each of which leads and trails the discharging openings respectively.

It is obvious that the portion 11a requires a breadth corresponding to at least 1.5 sections, though the breadth of the blinded portion 11b varies with the resting angle of the powder material.

Since the resting angle varies with the properties of the powder or granular material and a strict design of the length of the blinded portion 11b will require reconstruction of the apparatus in each detail when it is diverted to another material, a generally applicable extent of 0.3 section (about 10° of the center angle of the apparatus) is considered to be sufficient and convenient.

As previously mentioned, the continuous and constant sweeping and transferring of the fluidized layer will obviate the channeling which is often encountered in such case and will unify the period of time the powder or granular material lodges in the apparatus to the effect of good fluidization that prevents deterioration of the quality of the material and affords a homogeneous product.

Furthermore, the provision of the blinded portions before and behind the discharging opening as well as the relatively low pressure (slightly higher than atmospheric pressure) of the hot air, enables easy continuous operation obviating the necessity of applying air-tight lids or the like to the charging and discharging opening.

As the perforated plate, "punched metal plate" is ordinarily used, the size, shape and density of perforation thereof are however preferably selected in accordance with the nature of the powder or granulate material to be treated and with the operating condition of the apparatus.

On the other hand, the cyclone, incorporated in the apparatus of the present invention, constituting another important and unique feature thereof, primarily comprises a separating chamber including a cylindrical portion 21, a conical portion 22 and an outlet tube 31 of double construction including outer wall 32 equipped with plurality of guide vanes 35 thereon.

The cylindrical portion 21 defines the inner wall of said annular cylindrical drying chamber, and the outlet tube assembly 31–35, the aforedefined central rotating unit, is connected to the multiplicity of partition plates 18a–18l by the beam assembly 36.

The whole rotating asembly including central unit and partition plates is made rotatable by the driving force of any conventional driving means (not shown) transmitted through a pair of bevel gears 33 and 34.

The gaseous medium containing dust particles (carry over) sought to be separated in the cyclone is introduced into the separating chamber from the drying chamber through an annular cylindrical space 37 defined by the inner wall of the cylindrical portion 21 and the outlet tube 32, around its whole circumference.

The medium thus introduced has a turning tendency imparted thereto by the guide vanes 35 and descends along the inner walls of the cylindrical portion 21 and the conical portion 22, while being accelerated in accordance with the theorem of the conservation of angular momentum, dropped to the bottom part of the conical portion to effect separation of dust particles and thereafter flows up as a central ascending flow to be exhausted through the outlet tube.

Any shape of guiding vanes 35 can preferably be employed so far as they can give a turning tendency to the descending flow.

In the apparatus illustrated here, the outlet tube assembly is made rotatable together with the partition plates, which means that the outlet tube assembly also serves as a suspending construction of the partition plates by the aid of the beam assembly 36, and tend to the effect that the rotation of the unit enables the uniform mixing of the gaseous medium having various moisture contents which depend on its origin where there is a need for preventing the adhesion of the adhesive particle to the walls, the guide vane and so on.

In other words, the employment of such rotating assembly is considered to be indispensable for the treatment of the gaseous medium from such an annular fluidized layer.

According to the present invention, the whole apparatus can be designed as a vertically detachable construction which facilitates overhaul and cleaning of the apparatus, and this is an extremely important feature thereof as a practical machine.

As previously described, with an apparatus built in accordance with the present invention, the separation of dust particles from carry-over and the drying of the product can be carried out in a unitary and compact apparatus which contribute to facilitating of operation, the shortening of the period of dwell for treatment and to the improvement of the quality of the product.

Having thus disclosed the invention, what is claimed is:
1. In apparatus for fluidized drying comprising:
a through flow reflux type cyclone including a separating chamber having an integrally formed cylindrical and conical portion, and an outlet tube mounted inside and coaxial with said cylindrical portion and having a plurality of guide vanes which occupy an annular cylindrical space defined by said cylindrical portion and said outlet tube,
a dryer outer shell which is coaxially-connected with said cyclone at the proximity of the bottom of said shell so that it surrounds said cyclone and is divided into upper and lower portions by an annular perforated plate for supporting fluidized material to be treated thereon, having means for introducing hot air into said lower portion, means for discharging treated material from said upper portion piercing through said lower portion, and a means for charging material to be treated in said upper portion;
a relationship of parts characterized by the double wall construction of said outlet tube which has an inner and outer wall, the distance between the two walls being large enough to prevent the mutual intervention between ascending flow and descending flow inside said cylindrical portion, said construction being rotatable with said plurality of guide vanes, and by
the provision of a plurality of partition plates capable of sequentially travelling within end of radially dividing an annular cylindrical space defined by said outer shell, said cylindrical portion and said perforated plate, each of said plates being large enough to travel along said annular cylindrical space sweeping the outer wall of said cylindrical portion, and the inner wall of said perforated plate, and is connected and rotatable with said outlet tube, and further characterized by
a blinded portion of said perforated plate which is large enough for preventing uncontrollable flow of the material to be treated being under the influence of said discharging means and which covers the part of said perforated plate between the part which corresponds to said charging means.

References Cited
UNITED STATES PATENTS

| | | | |
|---|---|---|---|
| 2,256,017 | 9/1941 | Curran | 34—187 X |
| 3,063,159 | 11/1962 | Falke et al. | 34—181 X |
| 3,311,993 | 4/1967 | Bersano | 34—187 X |
| 3,411,430 | 11/1968 | Rockwell. | |

FREDERICK L. MATTESON, JR., Primary Examiner

ROBERT A. DUA, Assistant Examiner

U.S. Cl. X.R.

34—181; 209—11, 10, 474